United States Patent [19]

deLarosiere

[11] 4,344,530

[45] Aug. 17, 1982

[54] CASE FOR BEVERAGE BOTTLES

[75] Inventor: Pierre J. deLarosiere, Lisbon, Portugal

[73] Assignee: International Container Systems, Inc., Tampa, Fla.

[21] Appl. No.: 188,252

[22] Filed: Sep. 17, 1980

[51] Int. Cl.³ .............................................. B65D 75/00
[52] U.S. Cl. ................................... 206/203; 206/427; 206/509; 220/236
[58] Field of Search ............... 206/427, 203, 503, 504, 206/509; 220/23.2, 23.6, 23.8

[56] References Cited

U.S. PATENT DOCUMENTS

| | | | |
|---|---|---|---|
| D. 147,981 | 11/1947 | Lehman | D58/13 |
| D. 195,101 | 4/1963 | Fogerty et al. | D58/5 |
| D. 195,702 | 7/1963 | Russo | D58/26 |
| D. 201,257 | 6/1965 | Vidal | D58/5 |
| 2,535,493 | 12/1950 | Gerber | 220/97 |
| 2,626,079 | 1/1953 | Keller | 220/21 |
| 2,743,030 | 4/1956 | Read | 220/21 |
| 3,055,542 | 9/1962 | Russo | 220/104 |
| 3,151,762 | 10/1964 | Vidal | 220/21 |
| 3,333,729 | 8/1967 | Rabb | 206/203 |
| 3,376,998 | 4/1968 | Cornelius | 206/203 |
| 4,095,720 | 6/1978 | Delbrouck et al. | 206/203 |

Primary Examiner—Joseph Man-Fu Moy
Attorney, Agent, or Firm—Pennie & Edmonds

[57] ABSTRACT

A reusable case 2 for bottles 4 has a plurality of pockets 64 for receiving base portions of the bottles. Each pocket 64 is equipped with a bottle side-wall gripper 15 and a bottle base support 70 for supporting the bottle 4 and orienting it so that a symmetry axis of the bottle 4 substantially coincides with a centerline of the pocket 64. Substantially coaxial with the pocket centerline is a stacking/cross-stacking case-rest 76. The cases 4 are dimensioned and the pockets 64 positioned so that cases of bottles can be arranged in layers in cross-stacked structure with the bottles 4 in each lower layer being oriented and positioned to locate closures 6 of the bottles 4 within the stacking/cross-stacking case rests 76 of the cases 2 of the next higher layer.

12 Claims, 9 Drawing Figures

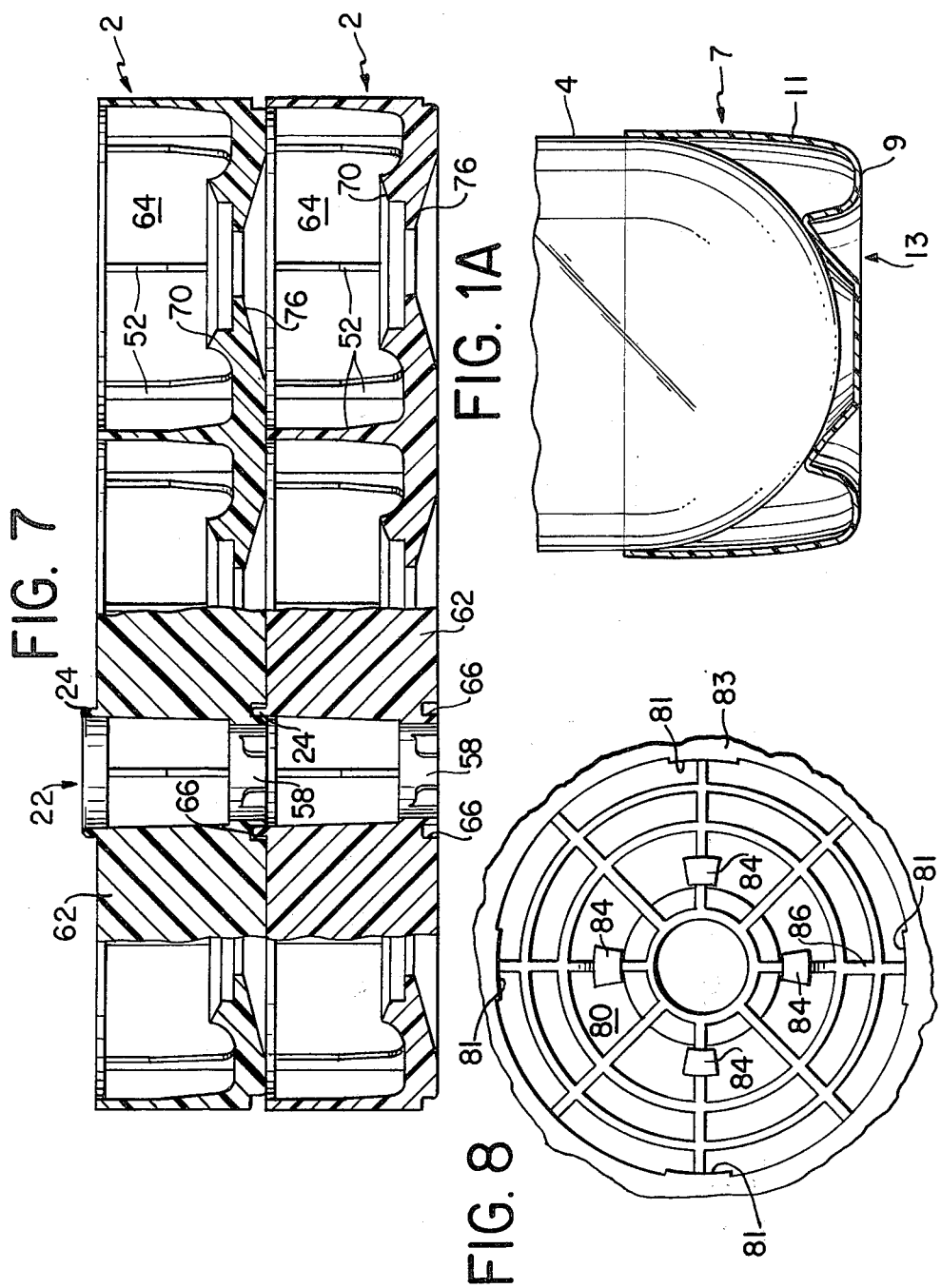

CASE FOR BEVERAGE BOTTLES

DESCRIPTION

1. Technical Field

The present invention relates to a reusable plastic case for beverage bottles and the like.

2. Background Art

Bottles made of plastic are widely used as containers for retailing soft drinks and other beverages. Bottles made of polyethylene terephthalate (PET) have become particularly popular with the soft-drink industry because of their transparency, light weight and low cost. Although the walls of such PET bottles are flexible, they are strong in tension and thus can safely contain the pressure of a carbonated beverage. Moreover, conventional PET bottles can bear surprisingly high compressive loads, provided that the load is directed substantially along an axial symmetry axis of the bottle. Thus a single PET bottle generally axially symmetric in shape and having a bottle closure sealing the opening of the bottle can support the weight of many bottles of the same size filled with beverage if the bottle in question is standing upright on a flat, horizontal surface and the weight of the other bottles is applied to the closure of the single bottle and directed substantially vertically along the symmetry axis. However, if a compressive load is applied to a conventional PET beverage bottle along a direction other than the symmetry axis of the bottle, the bottle tends to buckle and give way. The tendency of conventional PET bottles to give way under off-axis compressive loads is particularly pronounced for large capacity bottles, such as a two-liter bottle widely used for marketing soft drinks.

Bottles of soft drinks are ordinarily packaged by bottlers in cases or other containers, several bottles to the case, for shipment to retailers or for storage. Cases of bottles are customarily stacked one on top of the other for warehousing and shipment. Because of the tendency of conventional PET beverage bottles to buckle under off-axis loads, attempts to stack cases of these bottles give rise to serious problems for which no completely satisfactory solution has heretofore been available. For example, bottles can become tilted away from vertical alignment upon stacking if conventional partitioned cases having low side walls are used to contain the bottles. Tilted bottles in the lower cases of such a stack can buckle and give way, causing the stack to fall. Even should the bottles not buckle, the tendency of bottles, particularly tall, large-capacity bottles, to become tilted in conventional low-sided cases can give rise to problems. Such tilting generally places an undesirably low limit on the number of tiers in a stack since the tilting of bottles away from vertical in one case can cause the next higher case in the stack to become tilted away from horizontal, which can lead to instability if too many tiers are included in the stack.

In the past, these problems have been dealt with by packaging bottles of beverage in corrugated-paper cartons having high sides, equal in height to the height of the bottles, for example. Thus, two-liter PET bottles filled with soft drinks are often packaged in enclosed corrugated paper cartons for warehousing and shipment. Although the high sides of such cartons reduce the incidence of tilting and provide additional support when the cartons are stacked, the cartons represent a significant expense. The expense of the cartons cannot ordinarily be distributed over a number of repeated uses since corrugated-paper cartons are not generally rugged enough for reuse and are therefore usually discarded by the retailer.

A reusable bottle carrier is disclosed in U.S. Pat. No. 3,055,542 to Russo. The bottle carrier, which can be made of a plastic, is assembled from two pieces: a handle and a carrier body having six cups for soft-drink bottles. In order to stack the bottle carriers when empty, the handles must be removed. The bottle carriers of U.S. Pat. No. 3,055,542 are also seriously limited with regard to stacking when loaded with bottles. In warehouses, cases of bottles are frequently stacked on pallets which can be lifted and moved about by fork-lift trucks. The stacks of cases on the pallets must therefore be particularly stable in order to remain standing in the face of the jostling inherent in being moved about. A technique for interconnecting columns of cases, termed "cross stacking," is therefore often used to improve the stability of cases of bottles loaded on a warehouse pallet. Cross stacking generally involves stacking rectangular cases of bottles to build up a layered structure, with each layer being composed of cases oriented parallel to one another and with the cases in at least one layer, the cross-stacked layer, being oriented at right angles to the cases in the layer immediately below. Since each case in the cross-stacked layer rests upon at least two cases in the layer below, the cases of the cross-stacked layer tend to keep the cases on which they rest from moving apart from one another. The cross-stacked layer therefore stabilizes the structure. The bottle carriers of U.S. Pat. No. 3,055,542, however, cannot be arranged stably in a conventional cross-stacked structure. Reference to FIGS. 3 and 10 of U.S. Pat. No. 3,055,542 will show that the spacing between the bottles in the illustrated carriers is different in the directions parallel and perpendicular to the handle of the carrier. Consequently, if a first carrier is oriented at right angles to a second carrier as required for cross stacking, it is not possible to align the centers of the bases of four cups of the first carrier directly over the centers of the tops of four bottles held in the second carrier. However, such direct alignment is required for stable cross stacking. Direct alignment is particularly important for the bottle carriers of U.S. Pat. No. 3,055,542, since the bases of the cups of the carriers of that patent are made up of discs which are not significantly larger than the bottle tops upon which the bases must rest and the discs are held in place by narrow flexible strips of plastic.

DISCLOSURE OF INVENTION

I have invented a reusable plastic case for transporting bottles of beverage and the like which permits stable stacking of cases of bottles and which avoids the problems of the prior art noted above.

The invention will be described in terms of a case for carrying six conventional PET beverage bottles, although it will be appreciated that the principles of the invention embodied in the case described can be readily applied to cases for carrying other than six bottles and for carrying bottles other than the conventional PET type.

Conventional PET bottles are generally circularly symmetric in shape and have a top closure for sealing the bottle. The bottles also have a base portion having an annular bottom surface which is defined generally between a radially outer wall of the base portion and a radially inner indentation. The radially inner indentation is typically annular in shape. The annular bottom surface permits the bottle to stand on a flat surface.

The case of the invention has a generally rectangular top sheet with two crosswise edges and two lengthwise edges. The ratio of the distance between the crosswise edges to the distance between the lengthwise edges is approximately 3/2. A square lattice of vertex points can be defined with respect to the top sheet in which the length of the sides of the squares of the lattice is approximately equal to half the distance between the two lengthwise edges of the top sheet. Two adjacent squares of the lattice define a first and a second lattice square. The lattice is oriented and positioned so that (1) the edges of the lattice squares are generally parallel to the edges of the top sheet, (2) the corner vertices shared by the first and the second lattice square fall on a crosswise midline of the top sheet, and (3) a lengthwise midline of the top sheet substantially bisects the first and the second lattice squares. The top sheet has six pocket openings passing through it, each of which is shaped to receive a base-portion of a bottle. The pocket openings are preferably circular in shape, although other shapes may be used. Six pocket centerlines are defined by lines which are substantially perpendicular to the top sheet and which pass respectively through the six corner vertices of the first and the second lattice squares. The pocket openings are located so that a pocket centerline passes centrally through each pocket opening.

The case also includes a case side wall made up of crosswise and lengthwise wall sections. The side wall extends generally perpendicular to the top sheet and is connected to the edges of the top sheet. A trade name or the like can be printed on the side wall if desired. A lengthwise midplane is defined to be normal to the top sheet and to include the lengthwise midline. Each crosswise wall section has a hand-grip opening passing through it which is approximately centered with respect to the lengthwise midplane. Handles are preferably attached to the case at the hand-grip openings.

To reinforce the case and support the bottles, the case further includes a network of molded support ribs. A base plane can be defined generally parallel to the top sheet and located a distance from the top sheet which defines a case-height distance. The height of the case could be roughly 1/6 the height of the bottles, for example. The support ribs are located generally within the region defined by the top sheet, the case side wall, and the base plane. The top sheet and the case side wall are connected to a plurality of the support ribs for reinforcement. A plurality of the support ribs are disposed and contoured to define six pocket wells located respectively adjacent to the six pocket openings of the top sheet. Each pocket well and the adjacent pocket opening define a bottle pocket. Each pocket well is shaped to receive a base of a bottle.

The case also includes six bottle seating means associated with the bottle pockets for orienting and supporting the bottles. Each bottle seating means includes a bottle side-wall gripper configured to contact and exert pressure on at least three points spaced apart around a radially outer wall of a base portion of a bottle inserted in the corresponding bottle pocket to position and grip the bottle. In preferred embodiments of the invention in which the pocket openings are circular, the bottle sidewall gripper can include the rim of the pocket opening, so that bottles are gripped substantially at a continuum of points disposed circumferentially about an outer surface of the bottles. Each bottle seating means also includes a bottle base support located at a position intermediate between the bottle side-wall gripper and the base plane. The bottle base support is positioned and configured to fit within the radially inner indentation in the base portion of the bottle to support the bottle. The bottle side wall gripper and the bottle base support cooperate to orient bottles inserted in the bottle pocket so that the axial symmetry axis of the bottles substantially coincides with the pocket centerline.

Six stacking/cross-stacking case rests are respectively located generally coaxially with respect to the pocket centerline at positions intermediate between the corresponding bottle base supports and the base plane. Each case rest preferably has a generally flared configuration opening in the direction of the base plane to guide and center closures of bottles which are to support the case. A case of bottles can therefore be stacked on top of another case of bottles with the bottles of the lower case being positioned and oriented by the bottle seating means of that case to locate the closures of the bottles within the stacking/cross-stacking case rests of the upper case. Weight of the upper case is thereby transmitted to closures of bottles in the lower case by way of stacking/cross-stacking rests of the upper case.

Cases of the present invention are preferably adapted to be conveyed without excessive vibration on multiple-roller conveyors widely used in bottling plants. Thus in preferred embodiments of the invention a plurality of support ribs of the case have edges which lie substantially in the base plane to define case support base edges upon which the case can rest when in a horizontal rest position on a planar surface. The base edges are disposed so that each line in the base plane which extends perpendicular to the lengthwise midplane and which falls in a central region from roughly the case height distance from one end of the case to the case-height distance from the other end of the case at least approximately passes through at least two points on the case support base edges, the two points being on opposite sides of the lengthwise midplane. Thus, as a case is conveyed along a multiple-roller conveyor in a generally lengthwise direction, each roller can maintain contact with at least two points on either side of the lengthwise midplane as most of the length of the case passes over it. Moreover, the rollers of typical multiple-roller conveyors used in bottling plants are spaced sufficiently close together that several rollers would lie under the central region of the case defined above at each instant. The case can therefore be conveyed by the rollers of the conveyor with relatively little vibration.

Preferably the support ribs of the case of the invention are located sufficiently close to one another to form a network in which the openings of the network which face the base plane, other than openings providing access to the stacking/cross-stacking case rests, are too small to permit a bottle closure mounted on a bottle penetrate the openings. As a result, if a first case of bottles is placed out of alignment on top of a second, correcting the alignment is not hindered by the tops of bottles of the second case becoming wedged between support ribs of the first case.

Close spacing of the base edges of the support ribs of preferred cases of the invention results in excellent weight distribution when the case is resting on a flat surface such as a warehouse pallet. If desired, the base edges can be serrated to improve the traction of the case on conveyer belts, although such serrations can lead to increased vibration of the case on multiple-roller conveyers.

The case of the invention preferably also includes a stack interlocking mechanism which permits empty cases to be stacked one atop the other without sliding with respect to one another. The stack interlocking mechanism can include, for example, interlock-coupler notches located in the base edges of support ribs of the case and complementary coupler projections located on the top sheet of the case directly opposite the interlock-coupler notches. The interlock-coupler notches and the complementary coupler projections are reciprocally shaped so that the projections fit within the notches when a first case is placed base down on the top side of a second case which is empty.

The lattices of points defined with respect to the cases of the invention are conveniently thought of as extending indefinitely in a plane of the top of the case. Cases of the invention are dimensioned so that they can be placed side by side with the square lattices associated with the cases substantially coinciding. As a result, the cases of the present invention can readily be arranged in cross-stacked structures, since the bottles in a layer of such a structure can be located substantially at the vertex points of a square grid whether the cases of the layer are oriented in a given direction or at right angles to that direction. Moreover, such cross-stacked structures are extremely stable because the closures of the bottles of the lower cases are held within the stacking/cross-stacking case rests of the cases stacked upon the closures.

A generally flared shape for the stacking/cross-stacking case rests is preferred. Case rests of a flared shape tend to align correctly a case of bottles stacked upon another. Moreover, a case rest of this shape can accomodate bottle closures and openings of a variety of diameters.

The cases of the invention are particularly suited for stacking conventional PET beverage bottles, since the weight of the upper layers of a stack is transmitted to the bottles in the lower layers substantially through the bottle closures and along the symmetry axes of the bottles. As noted above, conventional PET bottles can bear substantial compressive loads if the loads are directed along the axial symmetry axes of the bottles.

A feature of the case of the present invention is that it can be molded as a unitary structure of a plastic material. Manufacturing costs can be low since it is not necessary to assemble preferred embodiments of the invention from a number of separately molded parts.

Because the cases of the invention hold bottles in place by a gripping action, the cases can have a low profile while nonetheless stabilizing the orientation of the bottles. The low height of the cases permits the weight and cost of materials of the cases to be low and simplifies molding of the cases. In addition, the low height contributes to the visual attractiveness of the cases. Preferred cases of the invention make visually appealing display racks for bottles in retail stores.

The cases of the invention are rugged and can be used repeatedly. Thus, although cases of the invention are generally more expensive initially than typical corrugated-paper cartons now employed for packaging bottled beverages, over their useful life cases of the invention are more economical to use for storing and shipping bottles of beverage.

BRIEF DESCRIPTION OF THE DRAWINGS

Preferred embodiments of the invention are described below with reference to the following drawings:

FIG. 1A is a cross sectional side view of a base portion of a typical PET beverage bottle.

FIG. 7 is a side view in section of two cases of FIG. 1 stacked empty one atop the other.

FIG. 8 is a top view of a bottle pocket of an alternative embodiment of the case of the invention.

BEST MODE FOR CARRYING OUT THE INVENTION

Figure 1:
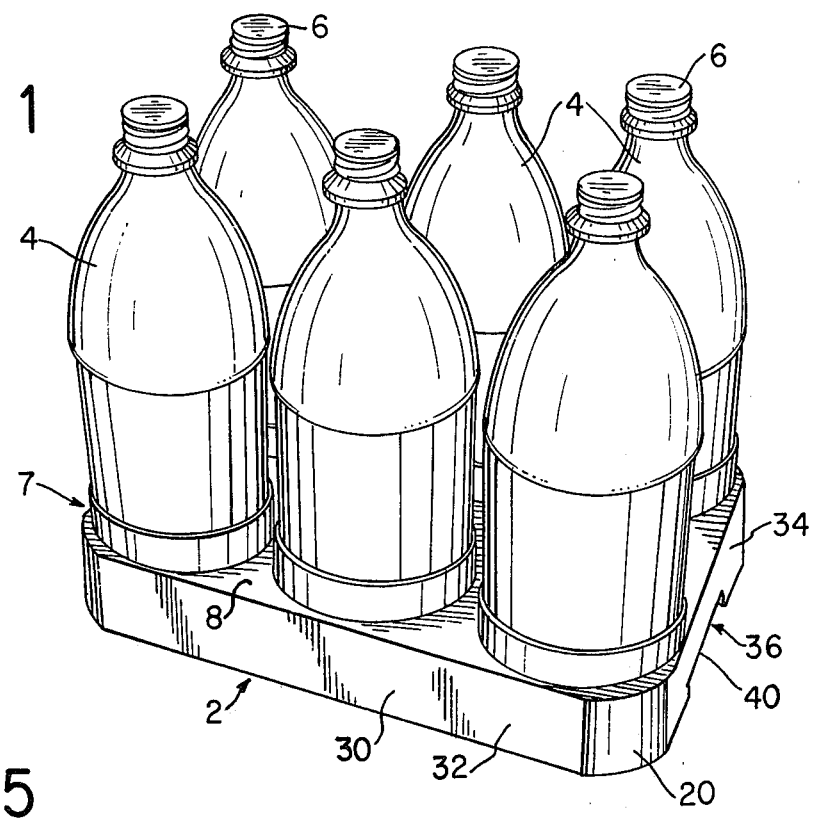
FIG. 1 is a perspective view of a preferred case of the invention containing six PET beverage bottles.

Referring now to FIG. 1, a case 2 contains six bottles. Each bottle 4 is a conventional two-liter PET beverage bottle. Each bottle 4 is approximately axially symmetric in shape and has a bottle closure 6 for sealing the bottle. Each bottle 4 includes a molded plastic base 7 upon which the bottle rests. As may be seen best in FIG. 1A, the base 7 has an annular bottom surface 9 located between a radially outer wall 11 and a radially inner indentation 13.

Figure 2:
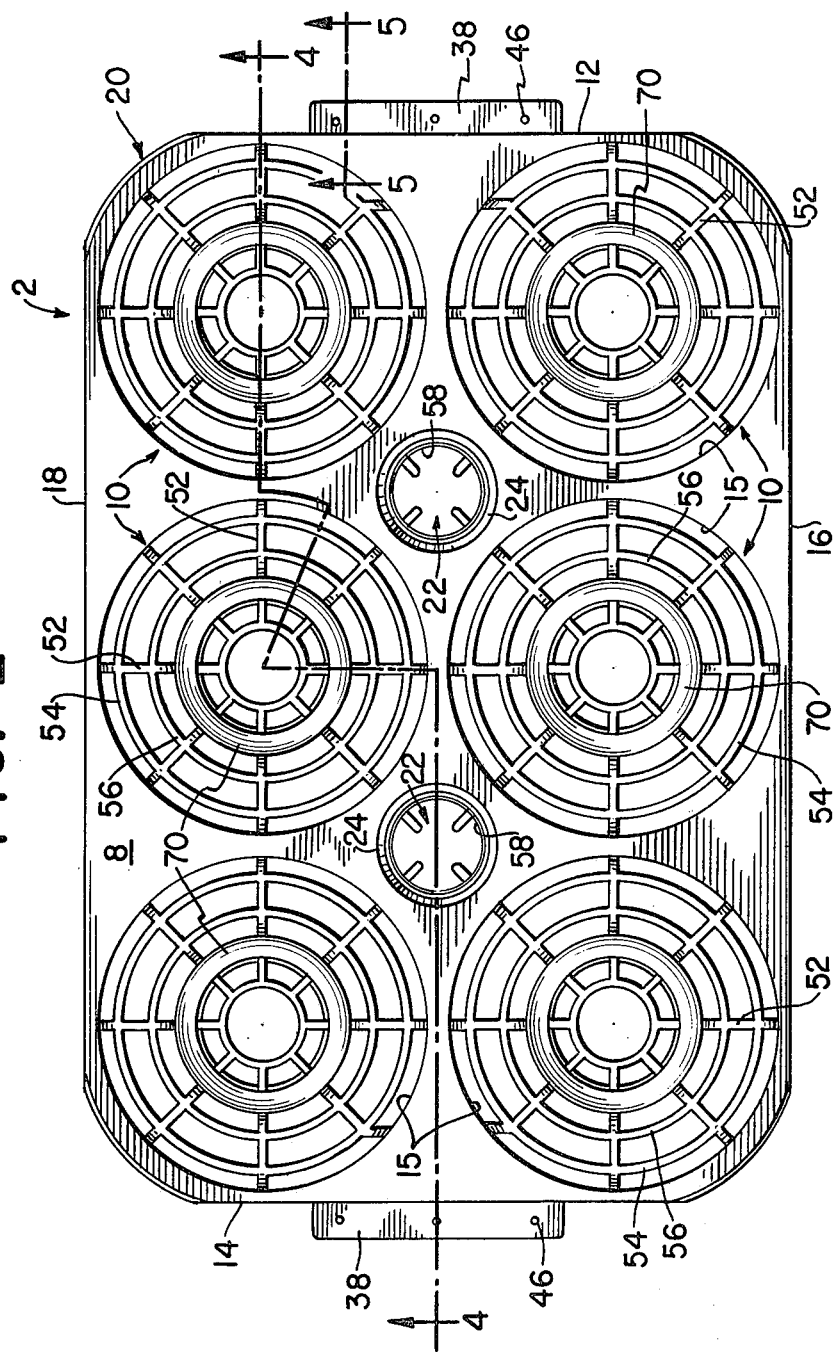
FIG. 2 is a top view of the case of FIG. 1.

Turning now to FIG. 2, the case 2 has a top sheet 8 which is generally rectangular in shape, having a first and a second crosswise edge 12 and 14 and a first and a second lengthwise edge 16 and 18. The ratio of the distance between the first and the second crosswise edges 12 and 14 to the distance between the first and second lengthwise edges 16 and 18 is approximately equal to 3/2.

Six pocket openings 10 pass through the top sheet 8. The location of the pocket openings 10 and other features of the top sheet 8 is conveniently understood in terms of a face-centered square lattice of points (not shown) defined to be coplanar with the top sheet 8. The face-centered square lattice is made up of corner vertices defined by the points of intersection of a square grid and center vertices defined by the centers of the squares of the grid. The length of the sides of the squares of the grid is approximately equal to one-half the distance between the two lengthwise edges of the top sheet 8. The lattice can be thought of as extending indefinitely in a plane in order to understand the relative positioning of cases of bottles in the tiers of a cross-stacked structure, as discussed below. The lattice is oriented with respect to the top sheet 8 so that mutually perpendicular sides of the squares of the grid are respectively parallel to the crosswise edges 12 and 14 and the lengthwise edges 16 and 18 of the top sheet 8. Two adjacent squares of the grid are singled out to define a first and a second lattice square. The lattice is positioned to locate the first and the second lattice squares symmetrically within the boundaries of the top sheet 8. In particular, the lattice is positioned so that the two corner vertices shared by the first and the second lattice squares fall on a crosswise midline of the top sheet 8, and so that a lengthwise midline of the top sheet 8 substantially bisects the first and the second lattice squares. Six pocket centerlines are defined by lines normal to the top sheet 8 and passing respectively through the six corner vertices of the first and the second lattice squares. The six pocket openings 10 in the top sheet 8 are substantially circular in shape and are positioned concentrically with respect to the six pocket centerlines.

Each pocket opening 10 has an inside diameter slightly less than an outside diameter of the base of the bottles 4. Consequently when a bottle 4 is inserted through the pocket opening 10, the rim 15 of the pocket opening 10 grips a radially outer side wall of the bottle circumferentially.

As shown best in FIG. 1, the case 2 has a side wall 30 which includes two opposing lengthwise wall sections 32 and two opposing crosswise wall sections 34. The corners 20 of the case 2 are rounded in order to minimize the weight and cost of materials of the case. Each crosswise wall section 34 has a hand-grip opening 36 passing through it. For good balance, the hand-grip openings 36 are approximately centered with respect to a lengthwise midplane which is defined to be a plane which is normal to the top sheet 8 and extends along the lengthwise midline of the top sheet. The hand-grip openings 36 extend upward from lower edges of the crosswise wall sections 34, which permits the openings to be formed in the wall sections 34 at the time the wall sections are molded.

Figure 5:
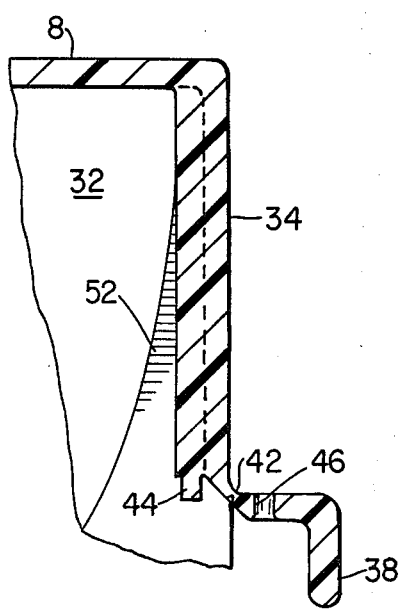
FIG. 5 is a cross sectional view taken along line 5—5' of FIG. 2 illustrating a handle of the case of FIG. 1 projecting outward in the orientation in which it is molded.
Figure 6:
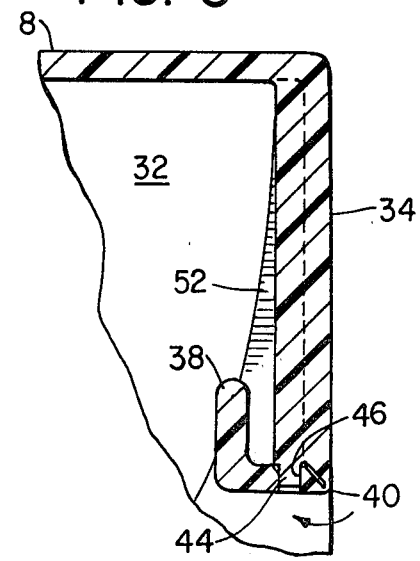
FIG. 6 shows the handle of FIG. 5 folded into the case in the orientation in which it serves as a hand grip.

A handle 38 is connected to each crosswise wall section 34 along a handle-attachment edge 40 of the hand-grip opening 36. The plastic material which joins the handle 38 to the crosswise wall section 34 is sufficiently thin to form a flexible hinge 42, which permits the handle 38 to be pivoted. The case 2 is molded with the handle 38 projecting outwardly from the crosswise wall section 34 in order to permit the handle to be molded at the same time as the case. After molding, the handle 38 is pivoted about the hinge 42 to an in-use orientation within the case, as shown in FIGS. 5 and 6. The handle 38 is fixed in the in-use orientation by handle-locking pins 44 attached to the corresponding crosswise wall section 34 and by handle-locking pin receptacles 46 located in the handle 38. The handle-locking pins 44 and pin receptacles 46 snap together when the handle 38 is pivoted to the in-use orientation to lock the handle in that orientation.

Figure 3:
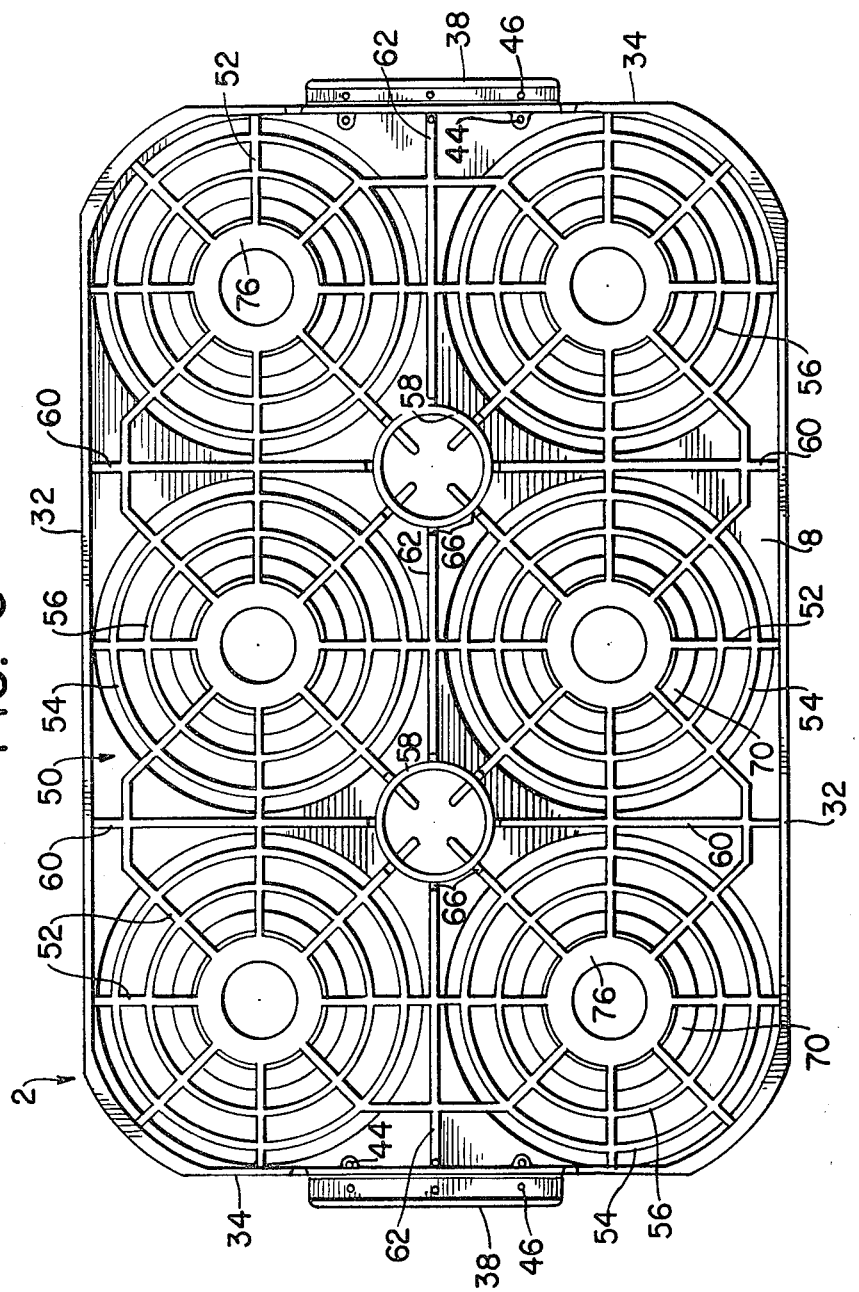
FIG. 3 is a bottom view of the case of FIG. 1.

Turning now to FIG. 3, the case 2 includes a network of support elements 50 to reinforce the case and support the bottles. The support elements 50 are molded integrally with the case 2 and are tapered slightly (not shown) in order to facilitate removing the case from the mold. The support elements 50 include contour ribs 52, pocket base ribs 54 and 56, center-ring ribs 58, and partition ribs 60 and 62. It will be apparent that many arrangements of support elements are possible other than the arrangement specifically illustrated in FIG. 3 and described below.

Associated with each pocket opening 10 is a set of eight contour ribs 52. The contour ribs 52 extend generally radially from the pocket centerline associated with the pocket opening 10 and are spaced apart substantially equiangularly about the centerline. As may be seen in FIG. 4, each contour rib 52 is shaped so that an edge of the rib follows generally a portion of the contour of the base 7 of a bottle 4. The contour ribs 52 associated with a pocket opening 10 therefore define a pocket well shaped to receive and guide a base 7 of a bottle 4 inserted through the pocket opening 10. The pocket well together with the adjacent pocket opening 10 define a bottle pocket 64.

Two annular concentric pocket base ribs 54 and 56 are connected to the contour ribs 52 of each bottle pocket 64. Each pair of pocket base ribs 54 and 56 is substantially centered with respect to the pocket centerline of the corresponding bottle pocket 64. It is convenient to define a base plane for the case 2 by a plane upon which the case rests when in a horizontal rest position on a flat surface. The base plane is substantially parallel to the top sheet 8 and spaced apart from the top sheet by a distance which defines the height of the case. The pocket base ribs 54 and 56 and the contour ribs 52 have base edges 67 which are adjacent to the base plane and thus provide support for the case when the case is in a horizontal rest position on a flat surface.

Two center-ring ribs 58 are spaced apart from and coaxial with two corresponding center-hole openings 22. The center-hole openings 22 are substantially circular in shape and respectively located concentric to the center vertices of the first and second lattice squares. The center-hole openings 22 may be used by automatic case-handling equipment in a bottling plant to position the case. As may be seen in FIGS. 2 and 4, each center-hole opening 22 is surrounded by a center-hole rim 24, which projects upward from the top sheet 8. The center-ring ribs 58 are approximately circular in shape and have an outside diameter which is less than an inside diameter of the center-hole rims 24. Each center-ring rib 58 has a base edge which lies substantially in the base plane of the case 2. The center-ring ribs 58 are connected to other support elements 52, 60 and 62 which have base edges lying substantially in the base plane. Each support element connected to a center-ring rib 58 has an interlock notch 66 in its base edge located adjacent to the base edge of the center-ring rib 58. The interlock notches 66 are disposed annularily about the base edge of the center-ring rib 58 and are shaped to receive a center-hole rim 24. Consequently, as shown best in FIG. 7, when two empty cases are stacked one on top of the other, the center-hole rims 24 of the lower case fit within the interlock notches 66 of the upper case to prevent the two cases from sliding with respect to one another.

Figure 4:
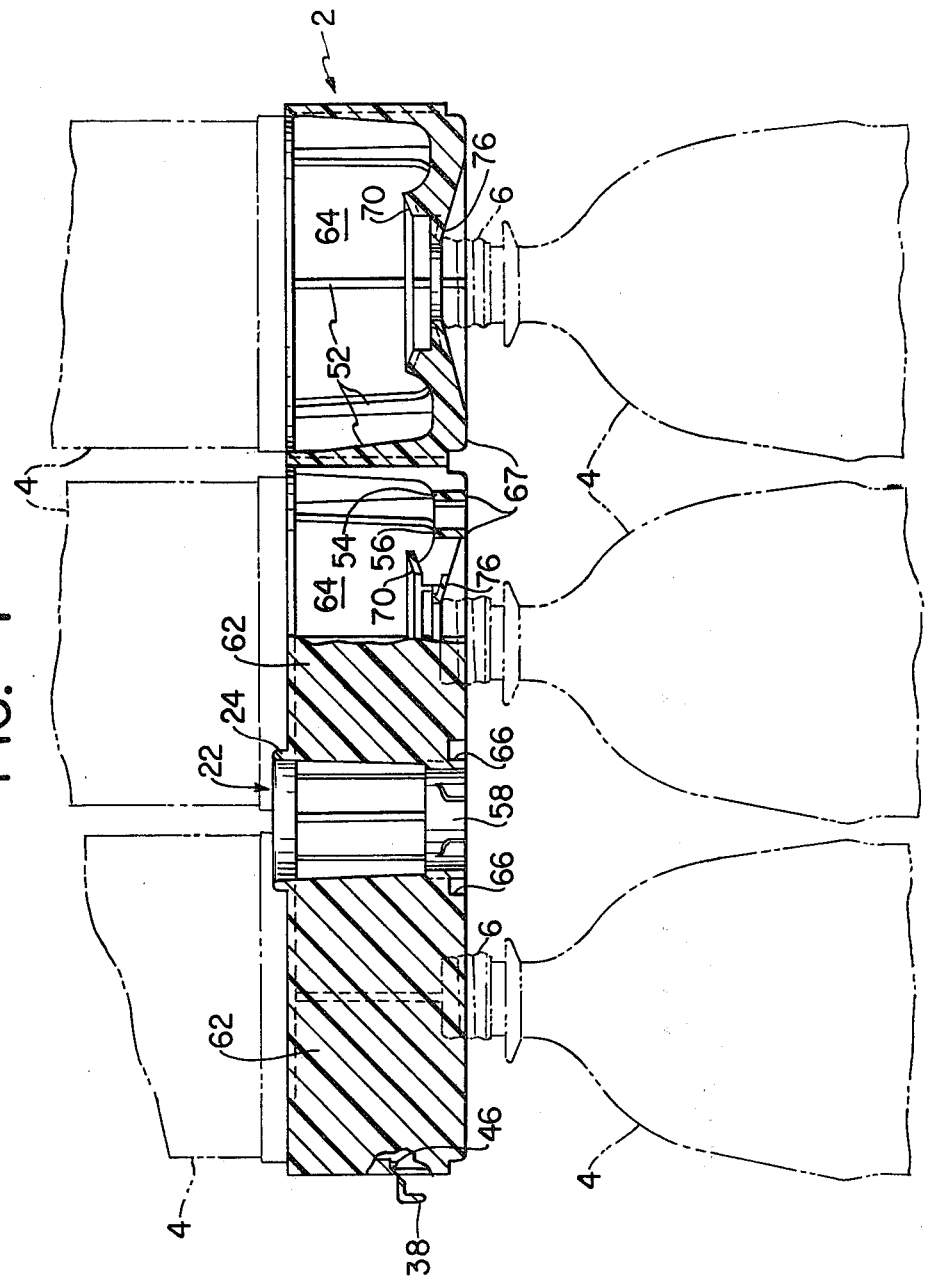
FIG. 4 is a cross sectional side view taken along line 4—4' of FIG. 2, illustrating the case of FIG. 1 stacked upon the bottles of a second case (not shown).

As may be seen in FIGS. 2 and 4, an annular bottle seat ring 70 is associated with each bottle pocket 64. The bottle seat ring 70 is connected to the contour ribs 52 associated with the bottle pocket 64 and is located substantially concentrically with respect to the centerline of the pocket. The bottle seat ring 70 is shaped to fit within the inner indentation 13 in the base 7 of a bottle 4. The base seat ring 70 therefore serves to support weight of a bottle in the bottle pocket 64. In addition, the bottle seat ring 70 and the rim of the corresponding pocket opening 10 cooperate to orient the bottle so that its axial symmetry axis lies substantially along the pocket centerline.

Associated with each bottle pocket 64 is a stacking/cross-stacking case-rest ring 76. The case-rest ring 76 is connected to the contour ribs 52 of the pocket 64 and is positioned generally coaxially with the pocket centerline. As shown in FIG. 4, the case-rest rings 76 are generally flared and open in the direction of the base plane of the case. The case-rest rings 76 permit a case to be placed upon bottles 4 with the case being supported by the bottles at the case-rest rings. The case-rest rings 76 are open at their centers to minimize wear on the bottle closures which support the case.

The cases 2 of bottles 4 can be arranged side-by-side and end-to-end in a first layer in which the face-centered square lattices defined with respect to the individual case substantially coincide. As a result, the bottle pockets 64 and thus the bottles they contain are located at the points of a square lattice which forms a sublattice of the face-centered square lattice of the cases. A second layer of cases of bottles can be stacked on top of the first layer. Since the case-rest rings 76 of the second layer can also be located at the points of a square lattice of the same dimensions and since square lattices have a ninety-degree rotational symmetry, the cases of the second layer can either be oriented parallel to the cases of the first layer or can be oriented at right angles to the cases of the first layer. Orientation of the cases of the second layer at right angles to the cases of the first layer is a cross-stacking arrangement, since each case of the second layer rests upon the bottles of two or more cases in the first layer. As has been pointed out above, such cross-stacked structures are highly stable.

The support elements 50 form a network having openings facing the base plane, as may be seen in FIG. 3. However, the openings in the network facing the base plan are sufficiently small to prevent a closure 6 on a bottle 4 from fitting within any opening of the network other than openings for the case rest rings 76. Base edges of support elements of the case 2 are disposed so that a roller oriented generally perpendicular to the lengthwise midplane and passing under the length of the cases except for narrow strips at either end makes contact with at least two points on either side of the midplane at each instant. Consequently the case 2 can be conveyed without excessive vibration on a multiple-roller conveyor.

Turning now to FIG. 8, a pocket 80 of an alternative embodiment of the case of the present invention is shown. Four contact pads 81 project radially inwardly from the edge of a pocket opening 82 in a top sheet 83. The four contact pads 81 grip the sides of the bottle inserted in the pocket 80 at four points spaced apart circumferentially about the sides of the bottle. Four bottle support pads 84 are connected to contour ribs 86 of the pocket. The four support pads fit within the radially inner indentation 13 in the base 7 of a bottle 4 to support the bottle and, in cooperation with the contact pads 81, to orient the bottle 4 so that its axial symmetry axis substantially coincides with the centerline of the pocket 80.

It is not intended to limit the present invention to the specific embodiment described above. For example, many other arrangements of support elements are possible. The handles or other features of the case could be molded separately. If contact pads and/or support pads are used, their number and positions can be varied from the arrangement illustrated in FIG. 8, although it is generally preferred for stability to use at least three contact pads and at least three support pads. It is recognized that these and other changes may be made in the case specifically described herein without departing from the scope and teaching of the instant invention, and it is intended to encompass all other embodiments, alternatives, and modifications consistent with the invention.

I claim:

1. A case for transporting bottles, the bottles having a longitudinal symmetry axis and having a top closure for sealing the bottle and a base portion contoured to permit the bottle to stand on a flat surface, the base portion having a bottom which contacts the surface on which the bottle stands, the bottom being defined generally between an outer wall of the base portion of the bottle and an indentation in the base portion, the case being molded from a plastic material and comprising:
   (a) an outer shell;
   (b) a plurality of support elements connected to and generally disposed within the outer shell for reinforcing the shell, the outer shell and support elements being shaped to define a plurality of bottle pockets, a square lattice of vertex points being defined in fixed geometric relationship to the outer shell, the bottle pockets being located at vertex points of squares of the lattice, the outer shell being shaped relative to the lattice of vertex points to permit a plurality of such cases with bottles inserted in the bottle pockets to be arranged in a multilayered cross-stacked structure;
   (c) bottle seating means associated with each of the bottle pockets for orienting and supporting bottles inserted into the pockets, each bottle seating means including:
      (c.1) a bottle side-wall gripper connected to at least one of the outer case and the support elements, the gripper being configured to grip a radially outer wall of a base portion of a bottle inserted in the bottle pocket to position the bottle, and
      (c.2) a bottle base support connected to at least one of the outer case and the support elements, the bottle base support being spaced apart along a pocket centerline from the bottle side-wall gripper, the bottle base support being positioned and configured to fit within the indentation in the base portion of a bottle inserted into the bottle pocket to support the bottle and, in cooperation with the bottle side-wall gripper, to orient the bottle so that the symmetry axis of the bottle substantially coincides with the pocket centerline; and
   (d) stacking/cross-stacking case rests associated respectively with each of the bottle pockets, each case rest being connected to one of the outer shell and the support elements and located generally coaxially with respect to the pocket centerline spaced apart from the bottle base support in a direction opposing the corresponding bottle side-wall gripper, each case rest being configured to locate a closure of a bottle oriented generally coaxially with the pocket center line, so that cases of bottles can be stacked one on top of the other with the bottles of a lower case being positioned and oriented by the bottle seating means of the lower case to locate the closures of the bottles within the stacking/cross-stacking case rests of an upper case, weight of the upper case thereby being transmitted to closures of bottles in the lower case by way of case rests of the upper case.

2. A case for transporting bottles of a beverage or the like, the bottles being generally circularily symmetric in shape and having a top closure for sealing the bottle and a base portion contoured to permit the bottle to stand on a flat surface, the base portion having an annular bottom surface which contacts the surface on which the bottle stands, the annular bottom surface being defined generally between a radially outer wall of the base portion of the bottle and a radially inner indentation in the base portion, the case being molded from a plastic material and comprising:

(a) a generally rectangular top sheet, the top sheet having a first and a second side, two opposing generally parallel edges of the top sheet defining a first and a second crosswise edge, and the two opposing edges which extend generally perpendicular to the crosswise edges defining a first and a second lengthwise edge, the ratio of the distance between the crosswise edges to the distance between the lengthwise edges being approximately 3/2, a crosswise midline being defined by a line located substantially midway between the two crosswise edges and extending substantially parallel to the two crosswise edges, a lengthwise midline being defined by a line located substantially midway between the lengthwise edges and extending generally parallel to the lengthwise edges, a lengthwise midplane being defined to include the lengthwise midline and to be perpendicular to the top sheet, a square lattice being defined substantially coplanar with the top sheet, the lattice having a plurality of vertex points located by the points of intersection of a square grid, the length of the sides of the squares of the grid being approximately equal to one-half the distance between the two lengthwise edges of the top sheet, two adjacent squares of the grid defining a first and a second lattice square, the lattice being oriented and positioned so that mutually perpendicular edges of the squares of the grid extend generally parallel to corresponding substantially mutually perpendicular edges of the top sheet, the two vertex points shared by the first and the second lattice squares fall on the crosswise midline of the top sheet, and the lengthwise midline substantially bisects the first and the second lattice squares, the six vertex points of the first and the second lattice squares thereby falling symmetrically within the boundary of the top sheet, the top sheet having six pocket openings passing through it, each pocket opening being shaped to receive a base portion of a bottle, a pocket centerline being defined for each pocket opening by a line substantially normal to the top sheet and passing centrally through the pocket opening, the six pocket openings being located so that the centerlines of the six pocket openings substantially pass respectively through the vertex points defined by the first and the second lattice squares;

(b) a case side wall, the case side wall having a first and a second crosswise wall section and a first and a second lengthwise wall section, the two lengthwise wall sections being connected to opposing lengthwise edges of the top sheet and extending generally in a direction opposing the first side of the top sheet, and the two crosswise wall sections being connected to opposing crosswise edges of the top sheet and extending generally in a direction opposing the first side of the top sheet, each crosswise wall section having a hand-grip opening therein approximately centered with respect to the lengthwise midplane;

(c) a network of molded support ribs for reinforcing the case and supporting the bottles, the ribs being located generally within a region defined by the top sheet, the case side wall, and a base plane defined generally parallel to the top sheet and located a distance from the top sheet defining a case-height distance, the top sheet and the case side wall being connected to a plurality of support ribs, a plurality of support ribs being disposed and contoured to define six pocket wells located respectively adjacent to the six pocket openings of the top sheet, each pocket well being shaped to receive a base of a bottle, each pocket well together with the adjacent pocket opening defining a bottle pocket;

(d) six bottle seating means associated respectively with the six bottle pockets for orienting and supporting a bottle inserted into the pocket, each bottle seating means including:

(d.1) a bottle side-wall gripper joined to at least one of the top sheet and the support ribs defining the pocket well, the gripper being configured to contact and exert pressure on at least three points spaced apart around a radially outer wall of a base portion of a bottle inserted in the bottle pocket to position and grip the bottle, and (d.2) a bottle base support connected to support ribs associated with the pocket well and located at a position intermediate between the bottle side-wall gripper and the base plane, the bottle base support being positioned and configured to fit within the radially inner indentation in the base portion of a bottle inserted into the bottle pocket to support the bottle and, in cooperation with the bottle side-wall gripper to orient the bottle so that an axial symmetry axis of the bottle substantially coincides with the pocket centerline; and (e) six stacking/cross-stacking case rests associated respectively with the six bottle pockets, each case rest being connected to support ribs and located generally coaxially with respect to the pocket centerline at a position intermediate between a corresponding bottle base support and the base plane, each case rest having a generally flared configuration opening in the direction of the base plane to locate a closure of a bottle oriented generally coaxially with the pocket center line upon which the case can rest, so that cases of bottles can be stacked one on top of the other with the bottles of a lower case being positioned and oriented by the bottle seating means of the lower case to locate the closures of the bottles within the stacking/cross-stacking case rests of an upper case, weight of the upper case thereby being transmitted to closures of bottles in the lower case by way of case rests of the upper case.

3. The case according to claim 2 in which a plurality of support ribs have edges lying approximately in the base plane to define case-support base edges upon which the case can rest when in a horizontal rest position on a planar surface, the base plane having first and second crosswise edge lines and first and second lengthwise edge lines defined thereon by projection of the corresponding crosswise and lengthwise edges of the top sheet onto the base plane in a direction normal to the base plane, the case-support base edges being disposed so that each line in the base plane extending perpendicular to the lengthwise midplane and falling in the region from about the case-height distance from the first crosswise edge line of the base plane to about the case-height distance from the second crosswise edge line at least approximately passes through at least two points on the case-support base edges, the two points being on opposite sides of the lengthwise midplane, the case thereby being adapted to be conveyed without excessive vibration on a multiple-roller conveyor.

4. The case according to claim 3 in which the support ribs are located sufficiently close to one another to form a network in which each opening of the network which faces the base plane other than openings for the case rests is sufficiently small in at least one dimension to prevent a bottle closure mounted on a bottle oriented generally normal to the base surface from penetrating the opening.

5. The case according to claim 4 further comprising:
(f) an empty-case stack interlocking mechanism including an interlock coupler located adjacent to the base plane and a complementary coupler positioned generally opposite to the interlock coupler in a direction normal to the base plane on an opposing side of the case, the interlock coupler and the complementary coupler being reciprocally shaped so that an interlock coupler of a first case and a complementary coupler of a second empty case engage when the first case is stacked upon the second with the base plane of the first case adjacent to the top sheet of the second case.

6. The case according to claim 5 in which the empty-case interlocking mechanism further includes a second interlock coupler and a second complementary coupler, the first and second complementary couplers being located on the top sheet at approximately the centers respectively of the first and the second lattice squares, and the first and the second interlock couplers being located adjacent to the base plane generally opposite to the first and the second complementary couplers respectively in a direction normal to the base plane.

7. The case according to claim 6 in which the hand-grip openings are generally rectangular in shape and are located in the respective crosswise wall section adjacent to the base plane, so that the hand-grip openings constitute rectangular notches along a base edge of the crosswise wall sections.

8. The case according to claim 7 in which each hand-grip opening has an edge extending generally parallel to the top sheet which defines a handle-attachment edge; and the case further comprises:
(g) a first and a second handle, each handle being flexibly connected to a crosswise wall section along the handle-attachment edge of the corresponding hand-grip opening, the thickness of the material joining the handle to the crosswise wall section being sufficiently thin to constitute a flexible hinge which permits the handle to be pivoted from an initial molding position projecting generally outward from the crosswise wall section to an in-use hand-grip position projecting generally inward from the crosswise wall section; and
(h) a first and a second handle orientation locking means for locking the first and second handles respectively in the in-use hand-grip orientation, the handle orientation locking means being connected to the crosswise wall section to which the handle is connected.

9. The case according to claim 2 in which the pocket openings in the top sheet are substantially circular in shape and are centered with respect to the pocket centerlines, the substantially circular edge of each pocket opening defining a pocket opening rim, an inside diameter of each pocket opening rim being less than an outside diameter of the base of the bottles by a bottle-grip length, so that each pocket-opening rim can contact and exert pressure circumferentially about a radially outer wall of a base portion of a bottle inserted in the bottle pocket, the pocket-opening rim thereby constituting the bottle side-wall gripper of the corresponding bottle pocket.

10. The case according to claim 9 in which the bottle base supports are annular rings positioned coaxially with respect to the pocket centerlines at a position intermediate between the top sheet and the base plane, the annular ring being dimensioned to fit within the radially inner indentation in the base portion of a bottle inserted into the bottle pocket.

11. The case according to claim 10 in which the stacking/cross-stacking case rests include annular case-rest rings connected to support ribs and positioned coaxially with respect to the pocket centerlines at a position intermediate between a corresponding bottle base support and the base plane, the case-rest rings being flared in shape opening in the direction of the base plane, an inside diameter of the case-rest rings being less than an outside diameter of the closures of the bottles so that the case-rest rings can rest against the closures of bottles on which the case is stacked.

12. A case for transporting bottles of a beverage or the like, the bottles being generally circularily symmetric in shape and having a top closure for sealing the bottle and a base portion contoured to permit the bottle to stand on a flat surface, the base portion having an annular bottom surface which contacts the surface on which the bottle stands, the annular bottom surface being defined generally between a radially outer wall of the base portion of the bottle and a radially inner indentation in the base portion, the case being a molded unitary structure of a plastic material comprising:
(a) a generally rectangular top sheet, the corners of the top sheet being rounded, the top sheet having a first and a second side, two opposing generally parallel edges of the top sheet defining a first and a second crosswise edge, and the two opposing edges which extend generally perpendicular to the crosswise edges defining a first and a second lengthwise edge, the ratio of the distance between the crosswise edges to the distance between the lengthwise edges being approximately 3/2, a crosswise midline being defined by a line located substantially midway between the two crosswise edges and extending substantially parallel to the two crosswise edges, a lengthwise midline being defined by a line located substantially midway between the lengthwise edges and extending generally parallel to the lengthwise edges, a lengthwise midplane being defined to include the lengthwise midline and to be perpendicular to the top sheet, a face-centered square lattice being defined substantially coplanar with the top sheet, the lattice having a plurality of corner vertices located by the points of intersection of a square grid and a plurality of center vertices located at the centers of the squares of the grid, the length of the sides of the squares of the grid being approximately equal to one-half the distance between the two lengthwise edges of the top sheet, two adjacent squares of the grid defining a first and a second lattice square, the lattice being oriented and positioned so that mutually perpendicular edges of the squares of the grid extend generally parallel to corresponding substantially mutually perpendicular edges of the top sheet, the two corner vertices shared by the first and the second lattice squares fall on the crosswise midline of the top sheet, and the center vertices of the first and the second lattice squares fall on the lengthwise midline of the top sheet, the six corner vertices of the first and the second lattice squares thereby falling symmetrically within the boundary of the top sheet, the top sheet having six pocket openings passing through it, each pocket opening being substantially circular in shape with an inside diameter being less than an outside diameter of a cross section of a base portion of a bottle by a bottle-grip length so that the pocket opening can receive the base portion of a bottle and grip it circumferentially, the centers of the six pocket openings substantially coinciding with the six corner vertices defined by the first and the second lattice squares, the top sheet having a first and a second centerhole opening passing through it, the first and the second centerhole openings being generally circular in shape with their centers substantially coinciding with the center vertices of the first and the second lattice squares respectively, a center-hole rim surrounding each center-hole opening circumferentially and projecting generally outwardly from the first side of top sheet;

(b) a case side wall, the case side wall having a first and a second crosswise wall section and a first and a second lengthwise wall section, the two crosswise wall sections being connected to opposing crosswise edges of the top sheet and extending generally perpendicular to the top sheet in a direction opposing the direction of projection of the center-hole rims, and the two lengthwise wall sections being connected to opposing lengthwise edges of the top sheet and extending generally perpendicular to the top sheet in a direction opposing the direction of projection of the center-hole rims, the lengthwise and crosswise wall sections being joined to form a substantially continuous side wall around a perimeter of the carton, each crosswise wall section having a hand-grip opening therein, the hand-grip opening extending from an edge of the wall section opposing the edge connected to the top sheet, one edge of the hand-grip opening extending generally parallel to the top sheet and defining a handle-attachment edge, the hand-grip opening being approximately centered with repect to the lengthwise midplane;

(c) a first and a second handle, each handle being flexibly connected to a crosswise wall section along the handle-attachment edge of the hand-grip opening, the thickness of the material joining the handle to the crosswise wall section being sufficiently thin to define a flexible hinge which permits the handle to be pivoted from an initial molding position projecting generally outward from the crosswise wall section to an in-use hand-grip position projecting generally inward from the crosswise wall section;

(d) a first and a second handle orientation locking means for locking the first and second handles respectively in the in-use hand-grip orientation, each handle orientation locking means being connected to the crosswise wall section to which the handle is connected;

(e) a network of support elements for reinforcing the case and supporting the bottles, the support elements including, (e.1) six sets of contour ribs, each set including a plurality of contour ribs, a pocket centerline being defined for each pocket opening by a line normal to the top sheet and passing through the corner vertex of the lattice which locates the pocket opening, the contour ribs of each set extending in a generally radial direction with respect to the pocket centerline of the associated pocket opening, and being spaced apart substantially equiangularly about the pocket centerline, each contour rib being shaped so that an edge of the rib generally facing a pocket centerline follows approximately a portion of the contour of the base of a bottle, each set of contour ribs thereby being shaped and disposed to define a pocket well, each pocket well together with the associated pocket opening defining a bottle pocket, each contour rib being connected to the top sheet of the case, in each set of contour ribs, at least a first and a second contour rib being connected to contour ribs associated with adjacent pockets, and at least a third contour rib being connected to the case side wall;

(e.2) six pairs of generally circular pocket base ribs associated respectively with the six bottle pockets, the two pocket base ribs of each pair being connected to the contour ribs of the associated bottle pocket, each pair of pocket base ribs including an inner and an outer pocket base rib located generally concentrically of one another and spaced apart radially, a base plane being substantially parallel to the top sheet and spaced apart by a case-height distance from the first side of the top sheet, the pocket base ribs being positioned generally coaxially with respect to the pocket center line of the associated bottle pocket with a base surface of the base rib lying approximately in the base plane; and (e.3) a first and a second center-ring rib spaced apart from the second side of the top sheet and approximately coaxial with the first and second center-hole openings respectively, each center-ring rib being connected to contour ribs associated with the bottle pockets of the corner vertices of the lattice square in which the center hole opening corresponding to the center-ring rib is located, each center-ring rib having a base rim, the center-ring ribs being positioned such that the base rims lie approximately in the base plane, an outside diameter of the center-ring ribs being less than an inside diameter of the center-hole rims so that a center-ring rib of a first case can fit inside a center-hole rim of a second case on which the first case is stacked, support elements connected to the center-ring ribs having interlock notches therein, the interlock notches being located adjacent to the base rims of the center ring ribs for receiving the center-hole rim of a second case on which the first case is stacked to prevent the cases from sliding with respect to one another;

(f) six generally annular bottle seat rings associated respectively with the six bottle pockets, each bottle seat ring being connected to the contour ribs of the associated pocket opening and located generally coaxially with respect to the pocket centerline of the bottle pocket at a position intermediate between the top sheet and the base plane, each bottle seat ring being positioned and configured to fit within the radially inner indentation in the base portion of a bottle inserted into the bottle pocket to support the bottle and, in cooperation with the pocket opening, to orient the bottle generally along the pocket centerline; and (g) six generally annular case rest rings associated respectively with the six bottle pockets, each case rest ring being connected to the contour ribs of the associated bottle pocket and located generally coaxially with respect to the pocket centerline at a position intermediate between a bottle seat ring and the base plane, the case-rest ring having a generally flared configuration opening in the direction of the base plane to locate a closure of a bottle oriented generally coaxially with the pocket centerline upon which the case can rest, so that cases of bottles can be stacked one on top of the other with the bottles of a lower case being positioned and oriented by the pocket openings and the bottle seat rings of the lower case to locate the closures of the bottles within the case-rest rings of an upper case, the support elements being located sufficiently close to one another to form a network in which each opening other than openings for case-rest rings which faces the base plane is sufficiently small in at least one dimension to prevent a bottle closure mounted on a bottle oriented generally normal to the base surface from penetrating the opening.

* * * * *

UNITED STATES PATENT AND TRADEMARK OFFICE
CERTIFICATE OF CORRECTION

PATENT NO. : 4,344,530

DATED : August 17, 1982

INVENTOR(S) : Pierre J. deLarosiere

It is certified that error appears in the above-identified patent and that said Letters Patent is hereby corrected as shown below:

Claim 1, paragraph (c.1), line 2,
change "outer case" to --outer shell--.

Claim 1, paragraph (c.2), line 2,
change "outer case" to --outer shell--.

Claim 12, paragraph (b), line 15,
change "carton" to --case--.

Signed and Sealed this

Seventh Day of November, 1989

*Attest:*

JEFFREY M. SAMUELS

*Attesting Officer*  *Acting Commissioner of Patents and Trademarks*

REEXAMINATION CERTIFICATE (828th)

United States Patent [19]

deLarosiere

[11] B1 4,344,530

[45] Certificate Issued  Mar. 29, 1988

[54] CASE FOR BEVERAGE BOTTLES

[75] Inventor: Pierre J. deLarosiere, Lisbon, Portugal

[73] Assignee: International Container Systems, Inc., Tampa, Fla.

Reexamination Request:
No. 90/001,057, Jul. 16, 1986
No. 90/001,060, Jul. 28, 1986

Reexamination Certificate for:
Patent No.: 4,344,530
Issued: Aug. 17, 1982
Appl. No.: 188,252
Filed: Sep. 17, 1980

[51] Int. Cl.$^4$ .................................................. B65D 75/00
[52] U.S. Cl. ..................................... 206/203; 206/427; 206/509; 220/236
[58] Field of Search ................... 220/4 C, 4 D, 23.6, 220/23.8, 23.83, 20, 21, 72, 74, 22, DIG. 2, DIG. 5; 206/503, 504, 501, 557, 509, 558, 559, 561–565, 821, 427, 203

[56]  References Cited

U.S. PATENT DOCUMENTS

| | | | |
|---|---|---|---|
| Re. 25,707 | 1/1965 | DeChelbor | 220/102 |
| Re. 29,262 | 6/1977 | Utz | 220/21 |
| D. 150,031 | 6/1948 | Richards | 58/13 |
| D. 152,906 | 3/1949 | Richards | 58/13 |
| D. 152,907 | 3/1949 | Richards | 58/13 |
| D. 169,743 | 6/1953 | Fritz, Jr. et al. | 58/13 |
| D. 171,132 | 12/1953 | Hudson | 58/5 |
| D. 189,998 | 3/1961 | Gottsegen | 58/17 |
| D. 194,808 | 3/1963 | Stevens et al. | 58/5.1 |
| D. 208,673 | 9/1967 | Adomat | 58/5 |
| D. 209,473 | 12/1967 | Versteeg et al. | 58/5 |
| D. 213,425 | 3/1969 | Hirota | 9/177 |
| D. 256,434 | 8/1980 | O'Donnal | 9/176 |
| 1,193,980 | 8/1916 | Bowen . | |
| 1,809,559 | 6/1931 | Mann . | |
| 2,063,390 | 12/1936 | Lindell | 220/21 |
| 2,064,518 | 12/1936 | Brogden | 220/97 |
| 2,329,656 | 9/1943 | Sedgwick | 224/48 |
| 2,339,474 | 1/1944 | Hardin | 220/21 |
| 2,377,520 | 6/1945 | Robinson, Jr. et al. | 229/52 |
| 2,407,079 | 9/1946 | Howard | 220/21 |
| 2,411,673 | 11/1946 | Vechey, Jr. | 220/21 |
| 2,414,171 | 1/1947 | Scharff | 220/21 |
| 2,424,475 | 7/1947 | Madan | 211/41 |
| 2,459,921 | 1/1949 | Comer | 220/21 |
| 2,510,591 | 6/1950 | Listman | 224/45 |
| 2,530,481 | 11/1950 | Rawn, Jr. | 220/76 |
| 2,535,113 | 12/1950 | Acton | 224/48 |
| 2,535,114 | 12/1950 | Acton | 224/48 |
| 2,574,983 | 11/1951 | Reed | 220/21 |
| 2,588,805 | 3/1952 | Cross | 220/21 |
| 2,589,452 | 3/1952 | Stevenson | 220/21 |
| 2,597,407 | 5/1952 | Thompson | 21/79 |
| 2,603,377 | 7/1952 | Mayers et al. | 217/19 |
| 2,619,251 | 11/1952 | Schmidt | 220/21 |
| 2,634,020 | 4/1953 | Bartholomew | 220/72 |
| 2,743,030 | 4/1956 | Read . | |
| 2,758,742 | 8/1956 | Farrell | 220/21 |
| 2,758,750 | 8/1956 | Stroop | 220/97 |
| 2,760,676 | 8/1956 | Knieriem et al. | 220/97 |
| 2,773,624 | 12/1956 | Knieriem et al. | 220/97 |
| 2,781,147 | 2/1957 | Ruschmann | 220/21 |
| 2,804,234 | 8/1957 | LaChance | 220/116 |
| 2,821,327 | 1/1958 | Glazer | 220/102 |
| 2,830,729 | 4/1958 | Brackett | 220/21 |
| 2,840,256 | 6/1958 | Cobb, Jr. | 220/4 |
| 2,918,379 | 12/1959 | Lurie | 99/174 |
| 2,928,530 | 3/1960 | Sauey | 206/3 |
| 2,931,535 | 4/1960 | Lockwood | 220/97 |
| 2,940,602 | 6/1960 | Lockwood | 211/126 |
| 2,948,433 | 8/1960 | Fineo | 220/102 |
| 2,963,193 | 12/1960 | Arthur | 220/21 |
| 2,964,210 | 12/1960 | Paley | 220/4 |
| 2,965,226 | 12/1960 | Ettlinger, Jr. | 206/72 |
| 2,970,715 | 2/1961 | Kappel et al. | 220/21 |
| 2,974,819 | 3/1961 | Melville | 220/20 |
| 2,994,463 | 4/1961 | Drader | 224/48 |
| 2,995,272 | 8/1961 | Larson | 220/102 |
| 3,002,650 | 10/1961 | Lovell | 220/97 |
| 3,005,572 | 10/1961 | Gustafson et al. | 220/72 |
| 3,009,564 | 11/1961 | Geloso | 206/1 |
| 3,009,579 | 11/1961 | Ettlinger, Jr. | 211/71 |
| 3,039,651 | 6/1962 | Lang | 220/110 |
| 3,045,862 | 7/1962 | DeChelbor | 220/102 |
| 3,045,863 | 7/1962 | DeChelbor | 220/102 |
| 3,080,087 | 3/1963 | Cloyd | 220/31 |
| 3,092,284 | 8/1963 | Stout | 220/21 |
| 3,106,308 | 10/1963 | Kazimier | 220/21 |
| 3,130,860 | 4/1964 | Oberkircher | 220/97 |
| 3,148,797 | 7/1964 | Cloyd | 220/21 |
| 3,148,822 | 7/1964 | Yochum, Jr. | 229/45 |
| 3,149,748 | 9/1964 | Hare et al. | 220/97 |
| 3,171,562 | 3/1965 | Weiss | 217/26.5 |
| 3,172,562 | 3/1965 | Nascher et al. | 220/97 |
| 3,178,052 | 4/1965 | Bromley | 220/102 |
| 3,206,020 | 9/1965 | Billingsley et al. | 206/65 |
| 3,219,233 | 11/1965 | Whiteford | 220/102 |
| 3,219,333 | 11/1965 | Derschmidt et al. | 267/1 |
| 3,220,596 | 11/1965 | Martin | 220/21 |
| 3,246,790 | 4/1960 | Martin | 220/21 |

(List continued on next page.)

OTHER PUBLICATIONS

Untitled Catalog of Plastic Containers.

*Primary Examiner*—Joseph Man-Fu Moy

[57]  ABSTRACT

A reusable case 2 for bottles 4 has a plurality of pockets 64 for receiving base portions of the bottles. Each pocket 64 is equipped with a bottle side-wall gripper 15 and a bottle base support 70 for supporting the bottle 4 and orienting it so that a symmetry axis of the bottle 4 substantially coincides with a centerline of the pocket 64. Substantially coaxial with the pocket centerline is a stacking/cross-stacking case-rest 76. The cases 4 are dimensioned and the pockets 64 positioned so that cases of bottles can be arranged in layers in cross-stacked structure with the bottles 4 in each lower layer being oriented and positioned to locate closures 6 of the bottles 4 within the stacking/cross-stacking case rests 76 of the cases 2 of the next higher layer.

U.S. PATENT DOCUMENTS

| Number | Date | Name | Class |
|---|---|---|---|
| 3,247,996 | 4/1966 | Garcia | 220/21 |
| 3,283,947 | 11/1966 | Cornelius | 220/102 |
| 3,297,196 | 1/1967 | Cornelius | 220/102 |
| 3,298,563 | 1/1967 | Rabb | 220/110 |
| 3,314,568 | 4/1967 | Cloyd | 220/21 |
| 3,326,410 | 6/1967 | Asenbauer | 220/97 |
| 3,332,574 | 7/1967 | Earp | 220/97 |
| 3,333,727 | 8/1967 | Belcher et al. | 220/97 |
| 3,334,768 | 8/1967 | Martin | 220/21 |
| 3,341,060 | 9/1967 | Rehrig et al. | 220/73 |
| 3,349,943 | 10/1967 | Box | 220/21 |
| 3,351,228 | 11/1967 | Huisman | 220/66 |
| 3,357,625 | 12/1967 | Malmgren | 229/2.5 |
| 3,361,292 | 1/1968 | Huisman | 220/97 |
| 3,363,802 | 1/1968 | Cornelius | 220/102 |
| 3,375,953 | 4/1968 | Miller, Jr. | 220/97 |
| 3,379,339 | 4/1968 | Asenbauer | 220/97 |
| 3,390,801 | 7/1968 | Adomat | 220/21 |
| 3,390,808 | 7/1968 | Rehrig et al. | 220/73 |
| 3,391,814 | 7/1968 | Box | 220/21 |
| 3,391,815 | 7/1968 | Box | 220/21 |
| 3,392,869 | 7/1968 | Needt | 220/21 |
| 3,393,827 | 7/1968 | Asenbauer | 220/97 |
| 3,416,694 | 12/1968 | Bebb | 220/21 |
| 3,419,182 | 12/1968 | Gildart | 220/73 |
| 3,428,207 | 2/1969 | Schoeller | 220/21 |
| 3,430,807 | 3/1969 | Rehrig | 220/97 |
| 3,506,154 | 4/1970 | Barnes | 220/83 |
| 3,517,852 | 6/1970 | Schoeller | 220/21 |
| 3,547,309 | 12/1970 | Pusey et al. | 220/97 |
| 3,565,278 | 2/1971 | Rehrig | 220/21 |
| 3,622,037 | 11/1971 | Gildart | 220/73 |
| 3,693,823 | 9/1972 | Rehrig | 220/4 |
| 3,701,449 | 12/1972 | Schoeller | 220/21 |
| 3,744,661 | 7/1973 | Fischer, Jr. | 220/21 |
| 3,762,594 | 12/1973 | Uty | 220/21 |
| 3,791,549 | 2/1974 | Delbrouck et al. | 220/21 |
| 3,809,279 | 5/1974 | Arjas | 220/21 |
| 3,812,996 | 5/1974 | Bunnell | 220/21 |
| 3,815,808 | 6/1974 | Bunnell | |
| 3,842,976 | 10/1974 | Dea | 206/203 |
| 3,863,759 | 2/1975 | Prodel | 206/203 |
| 3,865,239 | 2/1975 | Herolzer & Becknell | 206/507 |
| 3,912,075 | 10/1975 | Berry | 206/158 |
| 3,982,654 | 9/1976 | Gottsegen | 220/21 |
| 3,983,999 | 10/1976 | Morton | 206/498 |
| 3,991,879 | 11/1976 | Hirota | 206/203 |
| 4,027,796 | 6/1977 | Martin | 206/507 |
| 4,032,007 | 6/1977 | Graser et al. | 206/173 |
| 4,040,517 | 8/1977 | Tovokvei | 206/144 |
| 4,042,108 | 8/1977 | Brethauer | 206/392 |
| 4,071,162 | 1/1978 | Steinlein et al. | 220/21 |
| 4,105,117 | 8/1978 | Atkin et al. | 206/501 |
| 4,161,259 | 7/1979 | Palafox | 220/21 |
| 4,162,738 | 7/1979 | Wright | 220/21 |
| 4,165,003 | 8/1979 | Drader | 206/506 |
| 4,176,747 | 12/1979 | Aho | 206/509 |
| 4,204,596 | 5/1980 | Davis | 206/203 |
| 4,218,086 | 8/1980 | Klygis | 294/87.2 |
| 4,249,671 | 2/1981 | Crolli | 220/469 |
| 4,256,224 | 3/1981 | Hirota | 206/203 |
| 4,269,309 | 5/1981 | Prodel | 206/203 |
| 4,304,334 | 12/1981 | Hirota | 206/507 |
| 4,319,685 | 3/1982 | David | 206/507 |
| 4,342,388 | 8/1982 | Torokvei | 206/203 |
| 4,373,627 | 2/1983 | Wood | 206/201 |

FOREIGN PATENT DOCUMENTS

| Number | Date | Country | Class |
|---|---|---|---|
| 266062 | 8/1964 | Australia | |
| 283750 | 11/1965 | Australia | |
| 680197 | 2/1969 | Belgium | |
| 686780 | 5/1964 | Canada | 190/16 |
| 965056 | 3/1975 | Canada | 217/160 |
| 1109433 | 9/1985 | Canada | |
| 77479 | 9/1952 | Denmark | |
| 1207268 | 6/1966 | Fed. Rep. of Germany | |
| 1255160 | 1/1961 | France | |
| 1285689 | 1/1962 | France | |
| 1320916 | 2/1963 | France | |
| 1350962 | 4/1964 | France | |
| 1366608 | 6/1964 | France | |
| 1488661 | 7/1967 | France | |
| 1518610 | 2/1968 | France | |
| 6505562 | 10/1966 | Netherlands | |
| 464066 | 11/1968 | Switzerland | |
| 478031 | 10/1969 | Switzerland | |
| 662914 | 12/1951 | United Kingdom | |
| 758517 | 10/1956 | United Kingdom | |
| 789400 | 1/1958 | United Kingdom | |
| 907444 | 10/1962 | United Kingdom | |
| 943947 | 1/1962 | United Kingdom | |
| 1120067 | 7/1968 | United Kingdom | |
| 1125990 | 9/1968 | United Kingdom | |
| 1128243 | 9/1968 | United Kingdom | |
| 1152038 | 5/1969 | United Kingdom | |
| 1312701 | 4/1973 | United Kingdom | |
| 1567775 | 5/1980 | United Kingdom | |
| 412075 | 1/1974 | U.S.S.R. | |

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-12 is confirmed.

Claims 13-23 are added and determined to be patentable.

*13. A case for transporting bottles, the bottles having a longitudinal symmetry axis and having a top closure for sealing the bottle and a base portion contoured to permit the bottle to stand on a flat surface, the base portion having a bottom which contacts the surface on which the bottle stands, the bottom being defined generally between an outer wall of the base portion of the bottle and an indentation in the base portion, the case being molded from a plastic material and comprising:*

*(a) an outer shell including a case side wall having a first and second crosswise wall section and a first and second lengthwise wall section connected in a generally rectangular form;*

*(b) a network of molded support ribs for reinforcing the outer shell and supporting the bottles, the ribs being located generally within a region defined by a top plane generally perpendicular to the case side wall, the case side wall and a base plane defined generally parallel to the top plane and located a distance from the top plane defining a case height distance, the case side wall connected to a plurality of support ribs, the outer shell and a plurality of support ribs being shaped to define a plurality of bottle pockets, a square lattice of vertex points being defined in fixed geometric relationship to the outer shell, the bottle pockets being located at vertex points of squares of the lattice, the outer shell being shaped relative to the lattice of vertex points to permit a plurality of such cases with bottles inserted in the bottle pockets to be arranged in a multilayered cross-stacked structure;*

*(c) bottle seating means associated with each of the bottle pockets for orienting and supporting bottles inserted into the pockets, each bottle seating means including:*

*(c.1) a bottle side-wall gripper connected to at least one of the outer shell and the support ribs, the gripper being configured to grip a radially outer wall of a base portion of a bottle inserted in the bottle pocket to position the bottle, and*

*(c.2) a bottle base support connected to at least one of the outer shell and the support ribs, the bottle base support being spaced apart along a pocket centerline from the bottle side-wall gripper, the bottle base support being positioned and configured to fit within the indentation in the base portion of a bottle inserted into the bottle pocket to support the bottle, and, in cooperation with the bottle side-wall gripper, to orient the bottle so that the symmetry axis of the bottle substantially coincides with the pocket centerline; and*

*(d) stacking/cross-stacking case rests associated respectively with each of the bottle pockets, each case rest being connected to one of the outer shell and the support ribs and located generally coaxially with respect to the pocket centerline spaced apart from the bottle base support in a direction opposing the corresponding bottle side-wall gripper, each case rest being configured to locate a closure of a bottle oriented generally coaxially with the pocket centerline, so that the cases of bottles can be stacked one on top of the other with the bottles of a lower case being positioned and oriented by the bottle seating means of the lower case to locate the closures of the bottles within the stacking/cross-stacking case rests of an upper case, weight of the upper case thereby being transmitted to closures of bottles in the lower case by way of case rests of the upper case.*

*14. The case according to claim 13 in which the bottle pockets are disposed in two substantially parallel rows.*

*15. The case according to claim 14 in which the case has six bottle pockets disposed in two substantially parallel rows with three bottle pockets in each row.*

*16. The case according to claim 14 in which the outer shell includes:*

*(a.1) a generally rectangular top sheet, two opposing generally parallel edges of the top sheet defining a first and a second crosswise edge, and the two opposing edges which extend generally perpendicualar to the crosswise edges defining a first and a second lengthwise edge, a lengthwise midline being defined by a line located substantially midway between the lengthwise edges and extending generally parallel to the lengthwise edges, the lengthwise midline extending substantially midway between the two rows of bottle pockets, the top sheet having a plurality of pocket openings passing through it, each pocket opening being associated with a bottle pocket and being shaped to receive a base portion of a bottle; and*

*(a.2) a case side wall, the case side wall having a first and a second crosswise wall section and a first and a second lengthwise wall section, the two lengthwise wall sections being connected to opposing lengthwise edges of the top sheet, and the two crosswise wall sections being connected to opposing crosswise edges of the top sheet.*

*17. The case according to claim 16 in which a lengthwise midplane is defined to include the lengthwise midline and to be perpendicular to the top sheet, and each crosswise wall section has a hand-grip opening therein approximately centered with respect to the lengthwise midplane, each hand-grip opening being generally rectangular in shape and located in the respective crosswise wall section adjacent to a base plane of the case, so that the hand-grip openings constitute rectangular notches along a base edge of the crosswise wall sections.*

*18. A case for transporting bottles, the bottles having a longitudinal symmetry axis and having a top closure for sealing the bottle and a base portion contoured to permit the bottle to stand on a flat surface, the base portion having a bottom which contacts the surface on which the bottle stands, the bottom being defined generally between an outer wall of the base portion of the bottle and an indentation in the base portion, the case being molded from a plastic material and comprising:*

(a) an outer shell having a generally rectangular form, the outer shell including a top section and a case-side-wall section comprising a first and a second crosswise wall section and a first and a second lengthwise wall section;

(b) a network of molded support ribs for reinforcing the outer shell and supporting the bottles, the ribs being located generally within a region defined by the top section of the outer shell, the case-side-wall section of the outer shell and a base plane defined generally parallel to the top section of the outer shell and located a distance from the top section defining a case-height distance, the top section of the outer shell and the case-side-wall section of the outer shell being connected to a plurality of support ribs, the outer shell and a plurality of support ribs being shaped to define a plurality of bottle pockets, a square lattice of vertex points being defined in fixed geometric relationship to the outer shell, the bottle pockets being located at vertex points of squares of the lattice, the outer shell being shaped relative to the lattice of vertex points to permit a plurality of such cases with bottles inserted in the bottle pockets to be arranged in a multilayered cross-stacked structure;

(c) bottle seating means associated with each of the bottle pockets for orienting and supporting bottles inserted into the pockets, each bottle seating means including:

(c.1) a bottle side-wall gripper connected to at least one of the outer shell and the support elements, the gripper being configured to grip a radially outer wall of a base portion of a bottle inserted in the bottle pocket to position the bottle, and (c.2) a bottle base support connected to at least one of the outer shell and the support elements, the bottle base support being spaced apart along a pocket centerline from the bottle side-wall gripper, the bottle base support being positioned and configured to fit within the indentation in the base portion of a bottle inserted into the bottle pocket to support the bottle and, in cooperation with the bottle side-wall gripper, to orient the bottle so that the symmetry axis of the bottle substantially coincides with the pocket centerline; and (d) stacking/cross-stacking case rests associated respectively with each of the bottle pockets, each case rest being connected to one of the outer shell and the support ribs and located generally coaxially with respect to the pocket centerline spaced apart from the bottle base support in a direction opposing the corresponding bottle side-wall gripper, each case rest being configured to locate a closure of a bottle oriented generally coaxially with the pocket centerline, so that cases of bottles can be stacked one on top of the other with the bottles of a lower case being positioned and oriented by the bottle seating means of the lower case to locate the closures of the bottles within the stacking/cross-stacking case rests of an upper case, weight of the upper case thereby being transmitted to closures of bottles in the lower case by way of case rests of the upper case.

19. The case according to claim 18 in which the bottle pockets are disposed in two substantially parallel rows.

20. The case according to claim 19 in which the case has six bottle pockets disposed in two substantially parallel rows with three bottle pockets in each row.

21. The case according to claim 19 in which the top section of the outer shell includes a generally rectangular top sheet, two opposing generally parallel edges of the top sheet defining a first and a second crosswise edge, and the two opposing edges which extend generally perpendicular to the crosswise edges defining a first and a second lengthwise edge, a lengthwise midline being defined by a line located substantially midway between the lengthwise edges and extending generally parallel to the lengthwise edges, the lengthwise midline extending substantially midway between the two rows of bottle pockets, the top sheet having a plurality of pocket openings passing through it, each pocket opening being associated with a bottle pocket and being shaped to receive a base portion of a bottle, the two lengthwise wall sections of the outer shell being connected to opposing lengthwise edges of the top sheet, and the two crosswise wall sections of the outer shell being connected to opposing crosswise edges of the top sheet.

22. The case according to claim 21 in which a lengthwise midplane is defined to include the lengthwise midline and to be perpendicular to the top sheet, and each crosswise wall section has a hand-grip opening therein approximately centered with respect to the lengthwise midplane, each hand-grip opening being generally rectangular in shape and located in the respective crosswise wall section adjacent to a base plane of the case, so that the hand-grip openings constitute rectangular notches along a base edge of the crosswise wall sections.

23. A case for transporting bottles, the bottles having a longitudinal symmetry axis and having a top closure for sealing the bottle and a base portion contoured to permit the bottle to stand on a flat surface, the base portion having a bottom which contacts the surface on which the bottle stands, the bottom being defined generally between an outer wall of the base portion of the bottle and an indentation in the base portion, the case being molded from a plastic material and comprising:

(a) an outer shell;

(b) a plurality of support elements connected to and generally disposed within the outer shell for reinforcing the shell, the outer shell and support elements being shaped to define a plurality of bottle pockets, a square lattice of vertex points being defined in fixed geometric relationship to the outer shell, the bottle pockets being located at vertex points of squares of the lattice, the outer shell being shaped relative to the lattice of vertex points to permit a plurality of such cases with bottles inserted in the bottle pockets to be arranged in a multilayered cross-stacked structure;

(c) bottle seating means associated with each of the bottle pockets for orienting and supporting bottles inserted into the pockets, each bottle seating means including:

(c.1) a bottle side-wall gripper connected to at least one of the outer shell and the support elements, the gripper being configured to grip a radially outer wall of a base portion of a bottle inserted in the bottle pocket to position the bottle, and (c.2) a bottle base support connected to at least one of the outer shell and the support elements, the bottle base support being spaced apart along a pocket centerline from the bottle side-wall gripper, the bottle base support being positioned and configured to fit within the indentation in the base portion of a bottle inserted into the bottle pocket to support the bottle and, in cooperation with the bottle side-wall gripper, to orient the bottle so that the symmetry axis of the bottle substantially coincides with the pocket centerline; and (d) stacking/cross-stacking case rests associated respectively with each of the bottle pockets, each case rest being connected to one of the outer shell and the support elements and located generally coaxially with ect to the pocket centerline spaced apart from the
e base support in a direction opposing the correseding
bottle side-wall gripper, each case rest being
figured to locate a closure of a bottle oriented
rally coaxially with the pocket centerline, so that
s of bottles can be stacked one on top of the other
the bottles of a lower case being positioned and
ted by the bottle seating means of the lower case
cate the closures of the bottles within the stacking/cross-stacking case rests of an upper case, weight of the upper case thereby being transmitted to closures of bottles in the lower case by way of case rests of the upper case, whereby a cross-stacked structure of cases of bottles so oriented with the closures of bottles so located in case rests is stable to prevent bottles from tilting away from vertical alignment and from buckling under off axis loads.

* * * * *